United States Patent
Wang et al.

(10) Patent No.: US 10,652,315 B2
(45) Date of Patent: *May 12, 2020

(54) METHOD, APPARATUS, AND SYSTEM FOR DISTRIBUTING INFORMATION IN GRAPHIC CODE

(71) Applicant: Huawei Technologies Co., Ltd., Shenzhen (CN)

(72) Inventors: Zhandong Wang, Shenzhen (CN); Jingyu Lai, Bangalore (IN); Qi Zhu, Shenzhen (CN); Zhengang Xie, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/647,836

(22) Filed: Jul. 12, 2017

(65) Prior Publication Data

US 2017/0310740 A1    Oct. 26, 2017

Related U.S. Application Data

(63) Continuation of application No. 14/586,361, filed on Dec. 30, 2014, now Pat. No. 9,736,228, which is a
(Continued)

(30) Foreign Application Priority Data

Jul. 26, 2013    (CN) .......................... 2013 1 0319950

(51) Int. Cl.
G06F 15/16    (2006.01)
H04L 29/08    (2006.01)
(Continued)

(52) U.S. Cl.
CPC ................ *H04L 67/10* (2013.01); *G06F 8/61* (2013.01); *G06F 9/445* (2013.01); *G06F 9/54* (2013.01); *G06F 9/44505* (2013.01)

(58) Field of Classification Search
CPC . H04L 67/10; G06F 9/445; G06F 8/61; G06F 9/54; G06F 9/44505
See application file for complete search history.

(56) References Cited

U.S. PATENT DOCUMENTS

2006/0184619 A1*   8/2006   Tano ..................... G06F 8/61
                                                          709/203
2012/0181330 A1   7/2012   Kim
(Continued)

FOREIGN PATENT DOCUMENTS

CN         1635813 A      7/2005
CN     102279982 A    12/2011
(Continued)

OTHER PUBLICATIONS

Machine Translation and Abstract of Chinese Publication No. CN1635813, dated Jul. 6, 2005, 7 pages.
(Continued)

*Primary Examiner* — Suraj M Joshi
*Assistant Examiner* — Jaren Means
(74) *Attorney, Agent, or Firm* — Conley Rose, P.C.

(57) ABSTRACT

A method, an apparatus, and a system for distributing information in a graphic code. The method includes acquiring an identification code in a selected graphic code; sending to a server a first update request including the identification code when the identification code does not exist; receiving first response information fed back by the server; starting, according to the application program identifier in the first response information, an application program corresponding to the application program identifier. When an identification
(Continued)

code of a graphic code does not exist in an electronic device, an application program identifier corresponding to the identification code is requested from a server, and an application program corresponding to the application program identifier is started. Thus, a probability that information in a graphic code can be successfully processed is relatively high, and a success rate of identifying a graphic code is improved.

20 Claims, 7 Drawing Sheets

Related U.S. Application Data continuation of application No. PCT/CN2014/082992, filed on Jul. 25, 2014.

(51) Int. Cl.
*G06F 8/61* (2018.01)
*G06F 9/445* (2018.01)
*G06F 9/54* (2006.01)

(56) References Cited

U.S. PATENT DOCUMENTS

| | | | | |
|---|---|---|---|---|
| 2013/0043302 | A1* | 2/2013 | Powlen | G06F 16/381 235/375 |
| 2013/0059598 | A1* | 3/2013 | Miyagi | H04W 4/023 455/456.1 |
| 2013/0167143 | A1* | 6/2013 | Yi | G06F 8/61 717/178 |
| 2013/0205277 | A1* | 8/2013 | Seven | G06F 8/38 717/121 |
| 2014/0203071 | A1* | 7/2014 | Eggert | G06K 19/06112 235/375 |
| 2014/0289832 | A1 | 9/2014 | Rosenberg | |
| 2015/0120802 | A1 | 4/2015 | Wang et al. | |
| 2015/0213203 | A1* | 7/2015 | Cumbie | G16H 10/65 705/3 |

FOREIGN PATENT DOCUMENTS

| | | |
|---|---|---|
| CN | 102664871 A | 9/2012 |
| CN | 102722393 A | 10/2012 |
| CN | 103414765 A | 11/2013 |
| EP | 2437466 A1 | 4/2012 |
| WO | 2012102907 A2 | 8/2012 |

OTHER PUBLICATIONS

Machine Translation and Abstract of Chinese Publication No. CN102279982, dated Dec. 14, 2011, 9 pages.
Machine Translation and Abstract of Chinese Publication No. CN102664871, dated Sep. 12, 2012, 7 pages.
Machine Translation and Abstract of Chinese Publication No. CN102722393, dated Oct. 10, 2012, 9 pages.
Foreign Communication From a Counterpart Application, Chinese Application No. 201310319950.6, Chinese Office Action dated Oct. 28, 2015, 7 pages.
Foreign Communication From a Counterpart Application, European Application No. 14814664.0, Extended European Search Report dated Oct. 13, 2015, 8 pages.
Foreign Communication From a Counterpart Application, PCT Application No. PCT/CN2014/082992, English Translation of International Search Report dated Sep. 30, 2014, 2 pages.
Foreign Communication From a Counterpart Application, PCT Application No. PCT/CN2014/082992, English Translation of Written Opinion dated Sep. 30, 2014, 11 pages.
Foreign Communication From a Counterpart Application, Indian Application No. 201647002559, Indian Office Action dated Jan. 23, 2020, 9 pages.

* cited by examiner

METHOD, APPARATUS, AND SYSTEM FOR DISTRIBUTING INFORMATION IN GRAPHIC CODE

CROSS-REFERENCE TO RELATED APPLICATIONS

This application is a continuation of U.S. application Ser. No. 14/586,361, filed on Dec. 30, 2014, which is a continuation of International Application No. PCT/CN2014/082992, filed on Jul. 25, 2014. The International Application claims priority to Chinese Patent Application No. 201310319950.6, filed on Jul. 26, 2013. The afore-mentioned patent applications are hereby incorporated by reference in their entireties.

TECHNICAL FIELD

The present disclosure relates to the field of computer technologies, and in particular, to a method, an apparatus, and a system for distributing information in a graphic code.

BACKGROUND

A graphic code can include a large amount of information and is easy to be quickly identified by an electronic device, and therefore, the graphic code has already been used as a carrier for carrying information in an increasing number of scenarios. Generally, an electronic device disposed with a camera can acquire an external graphic code using the camera at any time in any place.

Currently, there is a method for distributing information in a graphic code, and the method may include using a camera on an electronic device to scan a graphic code; analyzing a scanned graphic code to obtain information that is carried in the graphic code and includes an identification code; detecting, in pre-stored application program identifiers, whether there is an appropriate application program identifier corresponding to the identification code of the graphic code; if there is an application program identifier corresponding to the identification code of the graphic code, starting an application program corresponding to the application program identifier, and processing information in the graphic code using the application program; and if there is not an application program identifier corresponding to the identification code of the graphic code, prompting, in a text form, a user with the information carried in the graphic code.

In a process of implementing the present disclosure, the inventor finds that the prior art has at least the following problem: Because the pre-stored application program identifiers are limited, for a graphic code acquired by an electronic device at any time in any place, a probability that an appropriate application program identifier can be found for the acquired graphic code is relatively low; as a result, a probability that information in a graphic code can be successfully processed is relatively low.

SUMMARY

In order to solve a problem, in the prior art, that a probability that information in a graphic code can be successfully processed is relatively low, embodiments of the present disclosure provide a method, an apparatus, and a system for distributing information in a graphic code. The technical solutions are as follows:

According to a first aspect, a method for distributing information in a graphic code is provided, where the method includes acquiring an identification code in a selected graphic code; when the identification code does not exist in a pre-stored local distribution configuration file, sending to a server a first update request that includes the identification code; receiving first response information that is fed back by the server after the server receives the first update request, where the first response information includes the identification code and an application program identifier corresponding to the identification code; and starting, according to the application program identifier in the first response information, an application program corresponding to the application program identifier, where the application program is used to process information carried in the graphic code, where the local distribution configuration file includes at least one mapping relationship, and each mapping relationship includes an identification code and an application program identifier corresponding to the identification code.

In a first possible implementation manner of the first aspect, after the receiving first response information that is fed back by the server after the server receives the first update request, the method further includes, when the application program corresponding to the application program identifier in the first response information is not installed, displaying a download page of the application program corresponding to the application program identifier, and prompting a user to download the application program.

With reference to the first aspect or the first possible implementation manner of the first aspect, in a second possible implementation manner, after the sending to a server a first update request that includes the identification code, the method further includes receiving second response information that is fed back by the server after the server receives the first update request, where the second response information is used to indicate that in the server there is not an application program identifier corresponding to the identification code; detecting whether the identification code is corresponding to a preset basic application program identifier, where a basic application program corresponding to the basic application program identifier includes a short message service (SMS) application program, a browser, or an address book; and if a result of the detecting is that the identification code is corresponding to one preset basic application program identifier, starting a basic application program corresponding to the basic application program identifier, and processing, using the basic application program, the information carried in the graphic code.

With reference to the first aspect, the first possible implementation manner of the first aspect, or the second possible implementation manner of the first aspect, in a third possible implementation manner, before the starting, according to the application program identifier in the first response information, an application program corresponding to the application program identifier, the method further includes, when there are two or more than two application program identifiers, reminding a user to select application programs corresponding to the application program identifiers; and after receiving a selection instruction that the user selects an application program identifier, determining an application program identifier according to the selection instruction; and the starting, according to the application program identifier in the first response information, an application program corresponding to the application program identifier includes starting, according to the determined application program identifier, an application program corresponding to the application program identifier.

With reference to the first aspect, the first possible implementation manner of the first aspect, the second possible implementation manner of the first aspect, or the third possible implementation manner of the first aspect, in a fourth possible implementation manner, the method further includes actively sending a second update request to the server at a predetermined moment, where the predetermined moment is a moment of first-time running or a moment indicated at an interval of a predetermined time; receiving third response information that is fed back by the server after the server receives the second update request, where the third response information includes at least one mapping relationship, and each mapping relationship includes an identification code and an application program identifier corresponding to the identification code; and updating the local distribution configuration file according to the at least one mapping relationship included in the third response information; or, receiving an update instruction sent by the server, where the update instruction includes at least one mapping relationship, and each mapping relationship includes an identification code and an application program identifier corresponding to the identification code; and updating the local distribution configuration file according to the at least one mapping relationship carried in the update instruction.

According to a second aspect, a method for distributing information in a graphic code is provided, where the method includes receiving a first update request that includes an identification code, where the first update request is sent by an electronic device after the electronic device acquires the identification code in a selected graphic code and when the identification code does not exist in a local distribution configuration file pre-stored in the electronic device; and feeding back first response information to the electronic device after receiving the first update request, where the first response information includes the identification code and an application program identifier corresponding to the identification code, so that the electronic device receives the first response information, and the electronic device starts, according to the application program identifier in the first response information, an application program corresponding to the application program identifier, where the application program is used to process information carried in the graphic code.

In a first possible implementation manner of the second aspect, before the feeding back first response information to the electronic device, the method further includes determining whether there is an application program identifier corresponding to the identification code; and if a result of the determining is that there is an application program identifier corresponding to the identification code, executing the step of feeding back first response information to the electronic device; or if a result of the determining is that there is not an application program identifier corresponding to the identification code, feeding back second response information to the electronic device, where the second response information is used to indicate that there is not an application program identifier corresponding to the identification code.

With reference to the second aspect or the first possible implementation manner of the second aspect, in a second possible implementation manner, the method further includes receiving a second update request sent by the electronic device at a predetermined moment, where the predetermined moment is a moment of first-time running or a moment indicated at an interval of a predetermined time; and feeding back third response information to the electronic device after receiving the second update request, where the third response information includes at least one mapping relationship, and each mapping relationship includes an identification code and an application program identifier corresponding to the identification code, so that the electronic device updates the local distribution configuration file according to the at least one mapping relationship included in the third response information; or, sending an update instruction to the electronic device, where the update instruction includes at least one mapping relationship, and each mapping relationship includes an identification code and an application program identifier corresponding to the identification code, so that the electronic device updates the local distribution configuration file according to the at least one mapping relationship included in the update instruction.

According to a third aspect, an apparatus for distributing information in a graphic code is provided, where the apparatus includes an acquiring module configured to acquire an identification code in a selected graphic code; a request sending module configured to, when the identification code acquired by the acquiring module does not exist in a pre-stored local distribution configuration file, send to a server a first update request that includes the identification code; a feedback receiving module configured to receive first response information that is fed back by the server after the server receives the first update request, where the first response information includes the identification code and an application program identifier corresponding to the identification code; and a control module configured to start, according to the application program identifier in the first response information received by the feedback receiving module, an application program corresponding to the application program identifier, where the application program is used to process information carried in the graphic code, where the local distribution configuration file includes at least one mapping relationship, and each mapping relationship includes an identification code and an application program identifier corresponding to the identification code.

In a first possible implementation manner of the third aspect, the apparatus further includes a displaying module configured to, when the application program corresponding to the application program identifier in the first response information received by the feedback receiving module is not installed, display a download page of the application program corresponding to the application program identifier, and prompt a user to download the application program.

With reference to the third aspect or the first possible implementation manner of the third aspect, in a second possible implementation manner, the apparatus further includes a detecting module, where the feedback receiving module is further configured to receive second response information that is fed back by the server after the server receives the first update request, where the second response information is used to indicate that in the server there is not an application program identifier corresponding to the identification code; the detecting module is configured to detect whether the identification code in the second response information received by the feedback receiving module is corresponding to a preset basic application program identifier, where a basic application program corresponding to the basic application program identifier includes an SMS application program, a browser, or an address book; and the control module is further configured to, when a result of the detecting of the detecting module is that the identification code is corresponding to one preset basic application program identifier, start a basic application program corresponding to the basic application program identifier, and process, using the basic application program, the information carried in the graphic code.

With reference to the third aspect, the first possible implementation manner of the third aspect, or the second possible implementation manner of the third aspect, in a third possible implementation manner, the control module is further configured to, when there are two or more than two application program identifiers, remind a user to select application programs corresponding to the application program identifiers; the control module is further configured to, after a selection instruction that the user selects an application program identifier is received, determine an application program identifier according to the selection instruction; and the control module is further configured to start, according to the determined application program identifier, an application program corresponding to the application program identifier.

With reference to the third aspect, the first possible implementation manner of the third aspect, the second possible implementation manner of the third aspect, or the third possible implementation manner of the third aspect, in a fourth possible implementation manner, the apparatus further includes an updating module, where the request sending module is further configured to actively send a second update request to the server at a predetermined moment, where the predetermined moment is a moment of first-time running or a moment indicated at an interval of a predetermined time; the feedback receiving module is further configured to receive third response information that is fed back by the server after the server receives the second update request, where the third response information includes at least one mapping relationship, and each mapping relationship includes an identification code and an application program identifier corresponding to the identification code; and the updating module is configured to update the local distribution configuration file according to the at least one mapping relationship included in the third response information; or, the apparatus further includes an update instruction receiving module and an updating module, where the update instruction receiving module is configured to receive an update instruction sent by the server, where the update instruction includes at least one mapping relationship, and each mapping relationship includes an identification code and an application program identifier corresponding to the identification code; and the updating module is configured to update the local distribution configuration file according to the at least one mapping relationship carried in the update instruction.

According to a fourth aspect, an apparatus for distributing information in a graphic code is provided, where the apparatus includes a request receiving module configured to receive a first update request that includes an identification code, where the first update request is sent by an electronic device after the electronic device acquires the identification code in a selected graphic code and when the identification code does not exist in a local distribution configuration file pre-stored in the electronic device; and a feedback module configured to feed back first response information to the electronic device after the request receiving module receives the first update request, where the first response information includes the identification code and an application program identifier corresponding to the identification code, so that the electronic device receives the first response information, and the electronic device starts, according to the application program identifier in the first response information, an application program corresponding to the application program identifier, where the application program is used to process information carried in the graphic code.

In a first possible implementation manner of the fourth aspect, the apparatus further includes a determining module, where the determining module is configured to determine whether there is an application program identifier corresponding to the identification code; and the feedback module is further configured to, when a result of the determining is that there is an application program identifier corresponding to the identification code, execute the step of a feeding back first response information to the electronic device; or the feedback module is further configured to, when a result of the determining is that there is not an application program identifier corresponding to the identification code, feed back second response information to the electronic device, where the second response information is used to indicate that there is not an application program identifier corresponding to the identification code.

With reference to the fourth aspect or the first possible implementation manner of the fourth aspect, in a second possible implementation manner, the request receiving module is further configured to receive a second update request sent by the electronic device at a predetermined moment, where the predetermined moment is a moment of first-time running or a moment indicated at an interval of a predetermined time; and the feedback module is further configured to feed back third response information to the electronic device after the second update request is received, where the third response information includes at least one mapping relationship, and each mapping relationship includes an identification code and an application program identifier corresponding to the identification code, so that the electronic device updates the local distribution configuration file according to the at least one mapping relationship included in the third response information; or, the apparatus further includes an update instruction sending module, where the update instruction sending module is configured to send an update instruction to the electronic device, where the update instruction includes at least one mapping relationship, and each mapping relationship includes an identification code and an application program identifier corresponding to the identification code, so that the electronic device updates the local distribution configuration file according to the at least one mapping relationship included in the update instruction.

According to a fifth aspect, a system for distributing information in a graphic code is provided, where the system includes at least one electronic device and a server, where the electronic device and the server are connected in a wired network manner or a wireless network manner; the electronic device includes the apparatus for distributing information in a graphic code according to the third aspect or the implementation manners of the third aspect; and the server includes the apparatus for distributing information in a graphic code according to the fourth aspect or the implementation manners of the fourth aspect.

According to a sixth aspect, an electronic device is provided, where the electronic device includes a receiver, a processor, and a sender, where the processor is separately coupled with the receiver and the sender; the processor is configured to acquire an identification code in a selected graphic code; the sender is further configured to, when the identification code does not exist in a pre-stored local distributing configuration file, send to a server a first update request that includes the identification code; the receiver is further configured to receive first response information that is fed back by the server after the server receives the first update request, where the first response information includes the identification code and an application program identifier corresponding to the identification code; and the processor is further configured to start, according to the application program identifier in the first response information, an application program corresponding to the application program identifier, where the application program is used to process information carried in the graphic code, where the local distribution configuration file includes at least one mapping relationship, and each mapping relationship includes an identification code and an application program identifier corresponding to the identification code.

In a first possible implementation manner of the sixth aspect, the processor is further configured to, when the application program corresponding to the application program identifier in the first response information is not installed, display a download page of the application program corresponding to the application program identifier, and prompt a user to download the application program.

With reference to the sixth aspect or the first possible implementation manner of the sixth aspect, in a second possible implementation manner, the receiver is further configured to receive second response information that is fed back by the server after the server receives the first update request, where the second response information is used to indicate that in the server there is not an application program identifier corresponding to the identification code; the processor is further configured to detect whether the identification code is corresponding to a preset basic application program identifier, where a basic application program corresponding to the basic application program identifier includes an SMS application program, a browser, or an address book; and the processor is further configured to, when a result of the detecting is that the identification code is corresponding to one preset basic application program identifier, start a basic application program corresponding to the basic application program identifier, and process, using the basic application program, the information carried in the graphic code.

With reference to the sixth aspect, the first possible implementation manner of the sixth aspect, or the second possible implementation manner of the sixth aspect, in a third possible implementation manner, the processor is further configured to, when there are two or more than two application program identifiers, remind a user to select application programs corresponding to the application program identifiers; the processor is further configured to, after receiving a selection instruction that the user selects an application program identifier, determine an application program identifier according to the selection instruction; and the processor is further configured to start, according to the determined application program identifier, an application program corresponding to the application program identifier.

With reference to the sixth aspect, the first possible implementation manner of the sixth aspect, the second possible implementation manner of the sixth aspect, or the third possible implementation manner of the sixth aspect, in a fourth possible implementation manner, the sender is further configured to actively send a second update request to the server at a predetermined moment, where the predetermined moment is a moment of first-time running or a moment indicated at an interval of a predetermined time; the receiver is further configured to receive third response information that is fed back by the server after the server receives the second update request, where the third response information includes at least one mapping relationship, and each mapping relationship includes an identification code and an application program identifier corresponding to the identification code; and the processor is further configured to update the local distribution configuration file according to the at least one mapping relationship included in the third response information; or, the receiver is further configured to receive an update instruction sent by the server, where the update instruction includes at least one mapping relationship, and each mapping relationship includes an identification code and an application program identifier corresponding to the identification code; and the processor is further configured to update the local distribution configuration file according to the at least one mapping relationship carried in the update instruction.

According to a seventh aspect, a server is provided, where the server includes a receiver, a processor, and a sender, where the processor is separately coupled with the receiver and the sender; the receiver is configured to receive a first update request that includes an identification code, where the first update request is sent by an electronic device after the electronic device acquires the identification code in a selected graphic code and when the identification code does not exist in a local distribution configuration file pre-stored in the electronic device; and the sender is configured to send first response information to the electronic device after the first update request is received, where the first response information includes the identification code and an application program identifier corresponding to the identification code, so that the electronic device receives the first response information, and the electronic device starts, according to the application program identifier in the first response information, an application program corresponding to the application program identifier, where the application program is used to process information carried in the graphic code.

In a first possible implementation manner of the seventh aspect, the processor is further configured to determine whether there is an application program identifier corresponding to the identification code; the sender is further configured to, when a result of the determining is that there is an application program identifier corresponding to the identification code, execute the step of feeding back first response information to the electronic device; and the sender is further configured to, when a result of the determining is that there is not an application program identifier corresponding to the identification code, feed back second response information to the electronic device, where the second response information is used to indicate that there is not an application program identifier corresponding to the identification code.

With reference to the seventh aspect or the first possible implementation manner of the seventh aspect, in a second possible implementation manner, the receiver is further configured to receive a second update request sent by the electronic device at a predetermined moment, where the predetermined moment is a moment of first-time running or a moment indicated at an interval of a predetermined time; and the sender is further configured to feed back third response information to the electronic device after the second update request is received, where the third response information includes at least one mapping relationship, and each mapping relationship includes an identification code and an application program identifier corresponding to the identification code, so that the electronic device updates the local distribution configuration file according to the at least one mapping relationship included in the third response information; or, the sender is further configured to send an update instruction to the electronic device, where the update instruction includes at least one mapping relationship, and each mapping relationship includes an identification code and an application program identifier corresponding to the identification code, so that the electronic device updates the local distribution configuration file according to the at least one mapping relationship included in the update instruction.

According to an eighth aspect, a system for distributing information in a graphic code is provided, where the system includes at least one electronic device and a server, where the electronic device and the server are connected in a wired network manner or a wireless network manner; the electronic device is the electronic device according to the sixth aspect or the implementation manners of the sixth aspect; and the server is the server according to the seventh aspect or the implementation manners of the seventh aspect.

The technical solutions provided in the embodiments of the present disclosure bring the following beneficial effects:

An electronic device acquires an identification code in a selected graphic code, and when the identification code does not exist in a pre-stored local distribution configuration file, sends to a server a first update request that includes the identification code, so that the server feeds back an application program identifier corresponding to the identification code, and the electronic device starts an application program corresponding to the application program identifier, where the application program is used to process information carried in the graphic code. This solves a problem in the prior art that a probability that information in a graphic code can be successfully processed is relatively low. Because the server updates an identification code of a graphic code and an application program identifier at any time, when there is no appropriate application program identifier corresponding to an acquired identification code of a graphic code in pre-stored application program identifiers, an appropriate application program identifier can be acquired from the server, an application program is determined according to the application program identifier, and information of the graphic code is processed according to the application program, which achieves an effect of improving a success rate of identifying a graphic code.

BRIEF DESCRIPTION OF DRAWINGS

To describe the technical solutions in the embodiments of the present disclosure more clearly, the following briefly introduces the accompanying drawings for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the embodiments of the present disclosure in detail with reference to the accompanying drawings.

Figure 1:
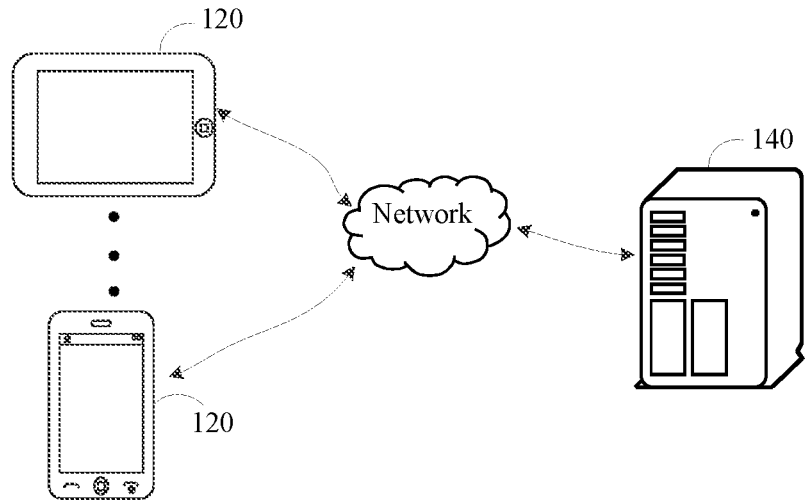
FIG. 1 is a schematic diagram of an implementation environment involved in a method for distributing information in a graphic code according to some embodiments of the present disclosure.

FIG. 1 shows a schematic diagram of an implementation environment involved in a method for distributing information in a graphic code according to the embodiments of the present disclosure. The implementation environment may include at least one electronic device 120 and a server 140.

The electronic device 120 may be a smartphone, a tablet computer, a desktop computer, a multimedia television set, a digital camera, an e-reader, and the like. Generally, one or more application programs may be installed in the electronic device 120.

The server 140 and each electronic device 120 may be connected in a wired network manner or a wireless network manner.

The server 140 may be one server, or a server cluster including some servers, or a cloud computing service center.

Figure 2:
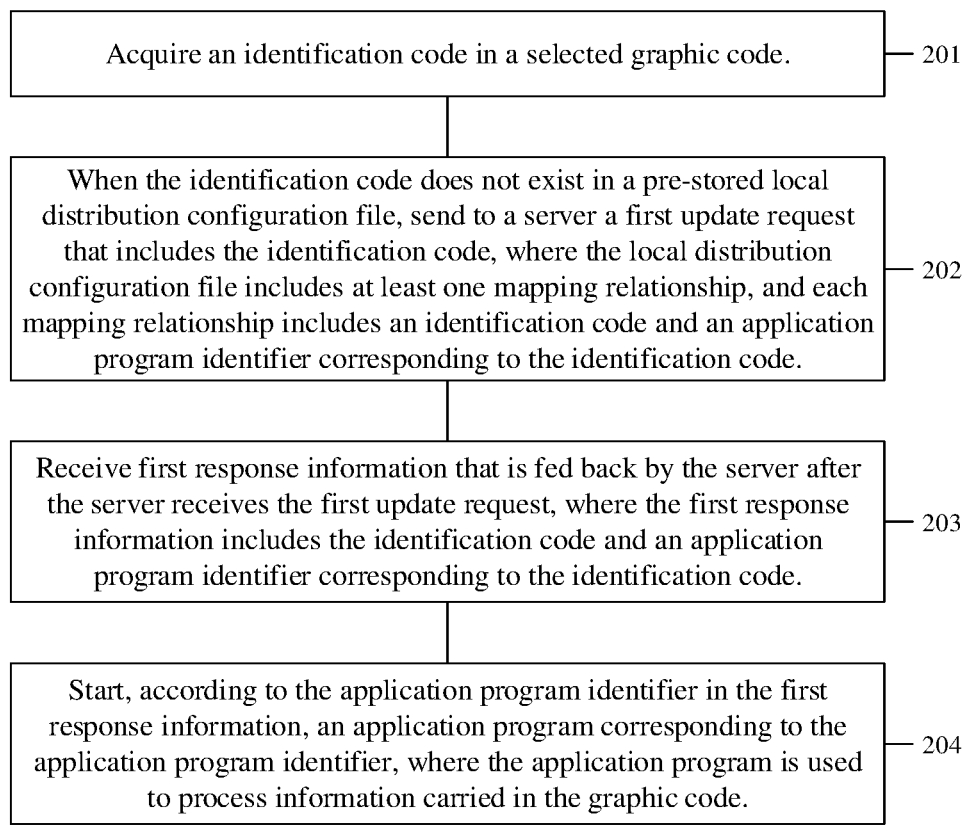
FIG. 2 is a method flowchart of a method for distributing information in a graphic code according to an embodiment of the present disclosure.

FIG. 2 shows a method flowchart of a method for distributing information in a graphic code according to an embodiment of the present disclosure. The method for distributing information in a graphic code may be described using the electronic device 120 implemented in the implementation environment shown in FIG. 1 as an example. The method for distributing information in a graphic code may include the following steps:

201. Acquire an identification code in a selected graphic code.

The graphic code mentioned herein may generally be a bar code, a two-dimensional code, and the like. The graphic code can represent related information using a displayed graph.

The identification code mentioned herein generally can uniquely determine one application program; for example, when the identification code is a web page address, the web page address may include content related to one application program.

For example, the electronic device 120 is generally disposed with a camera, where the camera may be used to scan a graphic code in front of the camera; and the electronic device 120 may use a graphic code scanned by the camera as the selected graphic code, and analyze the selected graphic code to obtain the identification code in the graphic code. In this embodiment, a camera icon may be disposed on a desktop of the electronic device 120, and the camera in the electronic device 120 can be directly enabled using the camera icon; a graphic code in front of the camera can be directly acquired using the camera, and then an identification code in the graphic code is acquired; therefore, in a process of acquiring an identification code, more time can be saved, and efficiency is improved.

For another example, the electronic device 120 may not only acquire a graphic code using a camera, but also acquire content including a graphic code in other manners, such as a web page including a graphic code, and an SMS message including a graphic code. In this case, a user can select a graphic code in the content using a touchscreen, and send the selected graphic code to a processor in the electronic device 120; and when receiving the selected graphic code, the processor may analyze the graphic code and acquire an identification code in the graphic code.

202. When the identification code does not exist in a pre-stored local distribution configuration file, send to a server a first update request that includes the identification code, where the local distribution configuration file includes at least one mapping relationship, and each mapping relationship includes an identification code and an application program identifier corresponding to the identification code.

The application program identifier can uniquely determine one application program.

Initially, a mapping relationship existing in the local distribution configuration file may be preset; for example, some commonly used application programs that are generally installed in the electronic device 120 are determined, and correspondingly, a preset mapping relationship may be an identification code related to the commonly used application programs and an application program identifier.

After acquiring the identification code in the selected graphic code, the electronic device 120 may detect, in the local distribution configuration file, whether there is an identification code same as the identification code in the selected graphic code. If the electronic device 120 detects that the identification code does not exist in the local distribution configuration file, it indicates that an application program identifier corresponding to the identification code in the graphic code cannot be learned, and an appropriate application program cannot be found to process information carried in the graphic code; therefore, the electronic device 120 sends to the server 140 a first update request that includes the identification code, where the first update request is used to acquire an application program identifier corresponding to the identification code.

203. Receive first response information that is fed back by the server after the server receives the first update request, where the first response information includes the identification code and an application program identifier corresponding to the identification code.

In an actual application, after receiving the first update request, if the server 140 detects that the identification code in the first update request exists, the server 140 acquires the application program identifier corresponding to the identification code; and then the server 140 feeds back the first response information to the electronic device 120, where the first response information generally includes the identification code and the application program identifier corresponding to the identification code. Correspondingly, the electronic device 120 may receive the first response information fed back by the server 140.

204. Start, according to the application program identifier in the first response information, an application program corresponding to the application program identifier, where the application program is used to process information carried in the graphic code.

After receiving the first response information fed back by the server 140, the electronic device 120 may start the application program corresponding to the application program identifier in the first response information, where the application program is used to process the information carried in the graphic code.

According to the method for distributing information in a graphic code provided in this embodiment of the present disclosure, an identification code is acquired in a selected graphic code. When the identification code does not exist in a pre-stored local distribution configuration file, a first update request that includes the identification code is sent to a server, so that the server feeds back an application program identifier corresponding to the identification code, and the electronic device starts an application program corresponding to the application program identifier, where the application program is used to process information corresponding to the graphic code. This solves a problem in the prior art that a probability that information in a graphic code can be successfully processed is relatively low. Because the server updates an identification code of a graphic code and an application program identifier at any time, when there is no appropriate application program identifier corresponding to an acquired identification code of a graphic code in pre-stored application program identifiers, an appropriate application program identifier may be acquired from the server, an application program is determined according to the application program identifier, and information of the graphic code is processed according to the application program, that is, information in a graphic code is distributed to a corresponding application program for processing, which achieves an effect of improving a success rate of identifying a graphic code.

Figure 3:
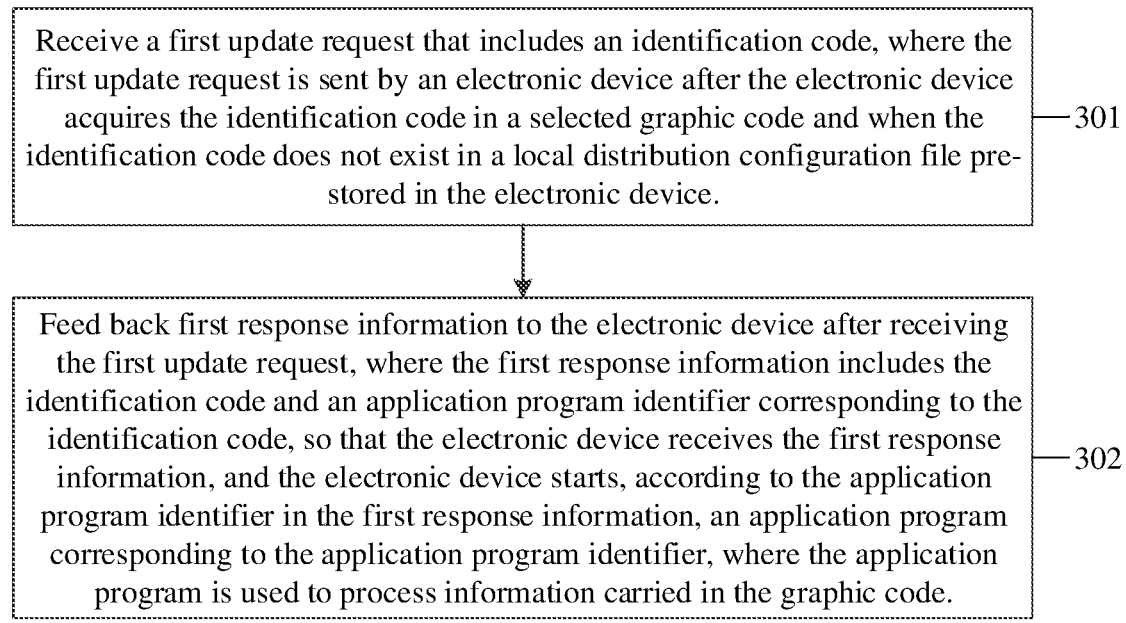
FIG. 3 is a method flowchart of a method for distributing information in a graphic code according to another embodiment of the present disclosure.

FIG. 3 shows a method flowchart of a method for distributing information in a graphic code according to another embodiment of the present disclosure. The method for distributing information in a graphic code may be described using the server 140 implemented in the implementation environment shown in FIG. 1 as an example. The method for distributing information in a graphic code may include the following steps:

301. Receive a first update request that includes an identification code, where the first update request is sent by an electronic device after the electronic device acquires the identification code in a selected graphic code and when the identification code does not exist in a local distribution configuration file pre-stored in the electronic device.

302. Feed back first response information to the electronic device after receiving the first update request, where the first response information includes the identification code and an application program identifier corresponding to the identification code, so that the electronic device receives the first response information, and the electronic device starts, according to the application program identifier in the first response information, an application program corresponding to the application program identifier, where the application program is used to process information carried in the graphic code.

After receiving the first update request that includes the identification code and is sent by the electronic device 120, the server 140 may determine that the electronic device 120 requests to learn an application program identifier corresponding to the identification code. Therefore, the server 140 searches whether there is an application program identifier corresponding to the identification code; and if there is an application program identifier corresponding to the identification code, the server 140 feeds back, to the electronic device 120, the first response information that includes the identification code and the application program identifier corresponding to the identification code. Correspondingly, after receiving the first response information, the electronic device 120 can start, according to the application program identifier in the first response information, an application program corresponding to the application program identifier, where the application program is used to process the information carried in the graphic code.

According to the method for distributing information in a graphic code provided in this embodiment of the present disclosure, a first update request that includes an identification code is received from an electronic device, and first response information that includes the identification code and an application program identifier corresponding to the identification code is fed back to the electronic device, so that the electronic device starts an application program corresponding to the application program identifier in the first response information, where the application program is used to process information corresponding to the graphic code. This solves a problem in the prior art that a probability that information in a graphic code can be successfully processed is relatively low. Because a server updates an identification code of a graphic code and an application program identifier at any time, when there is no appropriate application program identifier corresponding to an acquired identification code of a graphic code in pre-stored application program identifiers, an appropriate application program identifier may be acquired from the server, an application program is determined according to the application program identifier, and information of the graphic code is processed according to the application program, that is, information in a graphic code is distributed to a corresponding application program for processing, which achieves an effect of improving a success rate of identifying a graphic code.

Figure 4A:
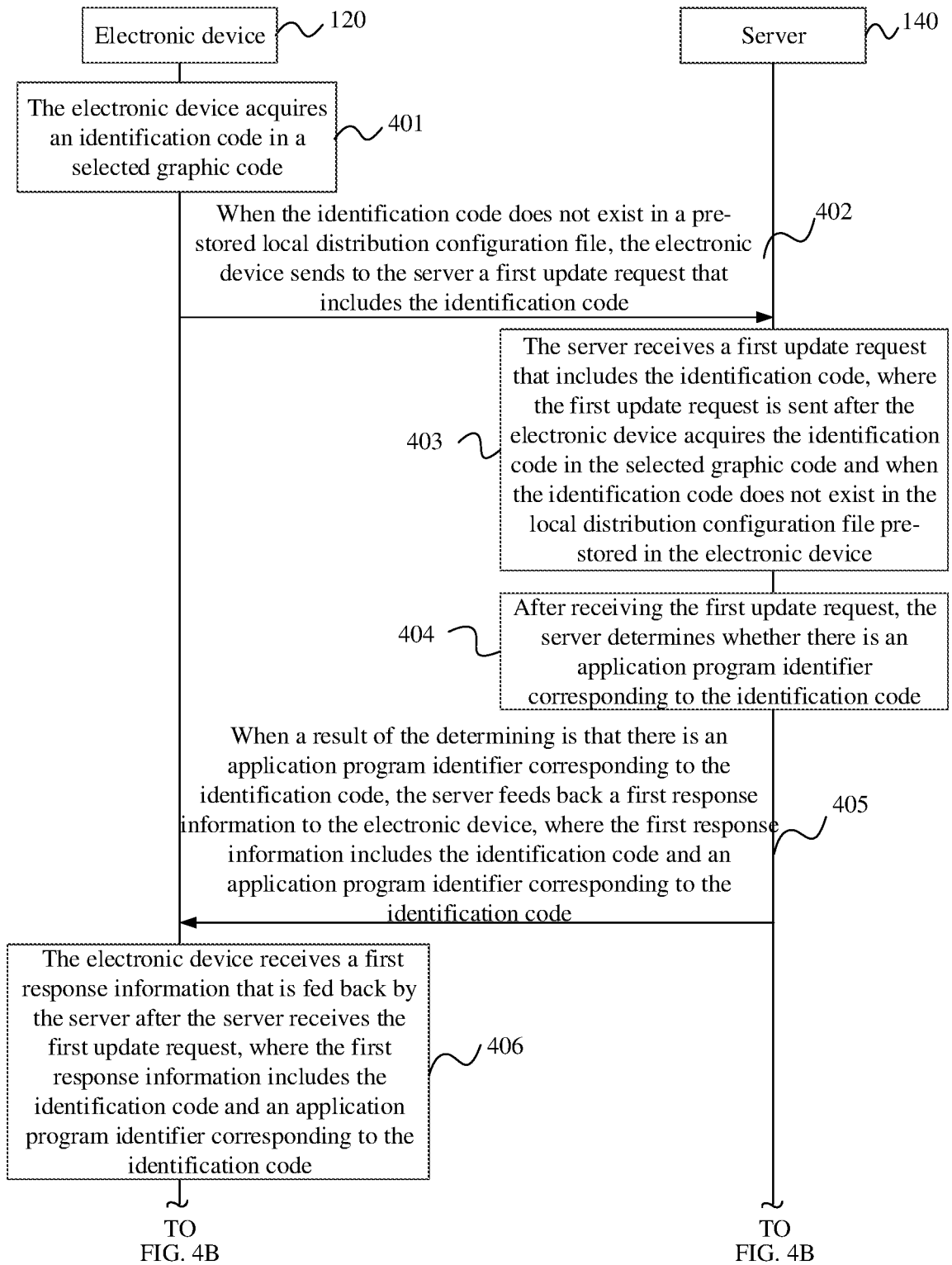
FIG. 4A and FIG. 4B are a method flowchart of a method for distributing information in a graphic code according to still another embodiment of the present disclosure.
Figure 4B:
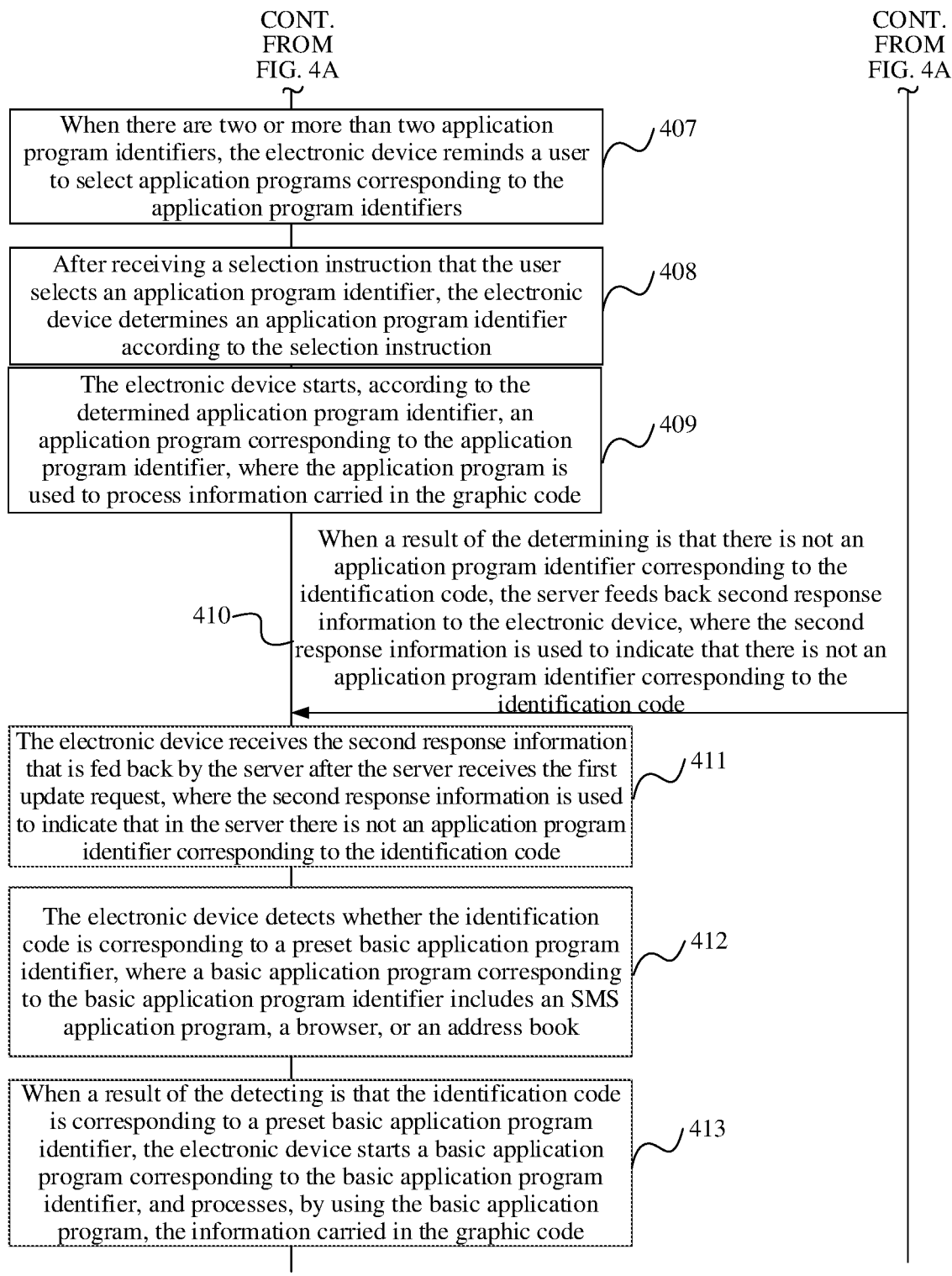

FIG. 4A and FIG. 4B show a method flowchart of a method for distributing information in a graphic code according to still another embodiment of the present disclosure. The method for distributing information in a graphic code may be described using the implementation environment shown in FIG. 1 as an example. The method for distributing information in a graphic code may include the following steps:

401. An electronic device acquires an identification code in a selected graphic code.

The identification code mentioned herein generally can uniquely indicate one application program; for example, when the identification code is a web page address, the web page address may include content related to one application program.

For example, the electronic device 120 is generally disposed with a camera, where the camera may be used to scan a graphic code in front of the camera; and the electronic device 120 may use a graphic code scanned by the camera as the selected graphic code, and analyze the selected graphic code to obtain the identification code in the graphic code. In this embodiment, a camera icon may be disposed on a desktop of the electronic device 120, and the camera in the electronic device 120 can be directly enabled using the camera icon; a graphic code in front of the camera can be directly acquired using the camera, and then an identification code in the graphic code is acquired; therefore, in a process of acquiring an identification code, more time can be saved, and efficiency is improved.

For another example, the electronic device 120 may not only acquire a graphic code using a camera, but also acquire content including a graphic code in other manners, such as a web page including a graphic code, and an SMS message including a graphic code. In this case, a user can select a graphic code in the content using a touchscreen, and send the selected graphic code to a processor in the electronic device 120; and when receiving the selected graphic code, the processor may analyze the graphic code and acquire an identification code in the graphic code.

In an actual application, there may be one, two, or more than two identification codes in a graphic code.

402. When the identification code does not exist in a pre-stored local distribution configuration file, the electronic device sends to a server a first update request that includes the identification code.

The local distribution configuration file includes at least one mapping relationship, and each mapping relationship includes an identification code and an application program identifier corresponding to the identification code.

The application program identifier can uniquely determine one application program.

Initially, a mapping relationship existing in the local distribution configuration file may be preset; for example, application programs that are generally installed in the electronic device 120 are determined, and correspondingly, a preset mapping relationship may be an identification code related to the application programs and an application program identifier.

After acquiring the identification code in the selected graphic code, the electronic device 120 may detect whether the identification code in the graphic code exists in the local distribution configuration file. If a result of the detecting is that the identification code exists in the local distribution configuration file, an application program identifier corresponding to the identification code is acquired from the local distribution configuration file, and an application program corresponding to the application program identifier is started, where the application program is used to process information carried in the graphic code.

If the electronic device 120 detects that the identification code does not exist in the local distribution configuration file, it indicates that an application program identifier corresponding to the identification code in the graphic code cannot be found, and an appropriate application program cannot be found to process the information carried in the graphic code; therefore, the electronic device 120 sends to the server 140 a first update request that includes the identification code, where the first update request is used to acquire an application program identifier corresponding to the identification code.

Particularly, when the number of identification codes in the graphic code is two or more than two, the electronic device sequentially detects whether the identification codes exist in the local distribution configuration file; and if a result of the detecting is that one or more of the identification codes does not exist in the local distribution configuration file, the electronic device sends to the server a first update request including the identification codes that do not exist in the local distribution configuration file.

403. The server receives the first update request that includes the identification code, where the first update request is sent after the electronic device acquires the identification code in the selected graphic code and when the identification code does not exist in the local distribution configuration file pre-stored in the electronic device.

404. After receiving the first update request, the server determines whether there is an application program identifier corresponding to the identification code.

After receiving the first update request that includes the identification code and is sent by the electronic device 120, the server 140 may determine that the electronic device 120 requests to learn an application program identifier corresponding to the identification code. Therefore, after receiving the first update request, the server 140 determines whether there is an application program identifier corresponding to the identification code.

405. When a result of the determining is that there is an application program identifier corresponding to the identification code, the server feeds back first response information to the electronic device, where the first response information includes the identification code and the application program identifier corresponding to the identification code.

When the first update request includes multiple identification codes, correspondingly, the first response information also includes the identification codes and application program identifiers corresponding to the identification codes.

406. The electronic device receives the first response information that is fed back by the server after the server receives the first update request, where the first response information includes the identification code and the application program identifier corresponding to the identification code.

407. When there are two or more than two application program identifiers, the electronic device reminds a user to select application programs corresponding to the application program identifiers.

408. After receiving a selection instruction that the user selects an application program identifier, the electronic device determines an application program identifier according to the selection instruction.

Obviously, if there is only one application program identifier in the first response information, step 409 may be directly performed.

409. The electronic device starts, according to the determined application program identifier, an application program corresponding to the application program identifier, where the application program is used to process information carried in the graphic code.

In an actual application, after receiving the first response information, the electronic device 120 further needs to detect whether the application program corresponding to the application program identifier in the first response information is already installed in the electronic device 120. If a result of the detecting is that the application program corresponding to the application program identifier in the first response information is not installed, a download page of the application program corresponding to the application program identifier is displayed to prompt the user to download the application program.

If the result of the detecting is that an application program corresponding to the determined application program identifier is already installed in the electronic device 120, the application program corresponding to the application program identifier is started according to the determined application program identifier.

410. When a result of the determining is that there is not an application program identifier corresponding to the identification code, the server feeds back second response information to the electronic device, where the second response information is used to indicate that there is not an application program identifier corresponding to the identification code.

That is, when detecting that there is not an application program identifier corresponding to the identification code, the server 140 feeds back the second response information to the electronic device 120; and in this case, the second response information generally includes only the identification code, so as to notify the electronic device 120 that an application program identifier corresponding to the identification code is not found.

Particularly, when the first update request includes more than one identification code, the server 140 determines whether the identification codes exist; if the server 140 does not acquire an application program identifier corresponding to one or several identification codes, the second response information includes only the identification codes that have no corresponding application program identifier.

411. The electronic device receives the second response information that is fed back by the server after the server receives the first update request, where the second response information is used to indicate that in the server there is not an application program identifier corresponding to the identification code.

412. The electronic device detects whether the identification code is corresponding to a preset basic application program identifier, where a basic application program corresponding to the basic application program identifier includes an SMS application program, a browser, or an address book.

The basic application program may not only be an SMS application program, a browser, and an address book, but also be other application programs that may generally be installed in the electronic device 120.

When the electronic device 120 receives the second response information that is fed back by the server 140, it indicates that the server 140 does not find an application program identifier requested by the electronic device 120; in this case, the electronic device 120 may query whether the identification code is corresponding to a basic application program identifier.

In an actual application, the basic application program identifier may be in another file different from the local distribution configuration file, or may be set in the end of the local distribution configuration file, that is, set behind other application program identifiers. In this way, when the application program identifier is neither found in foregoing application program identifiers in the local distribution configuration file, nor found by the server 140, the basic application program identifier in the end of the local distribution configuration file may be searched.

413. When a result of the detecting is that the identification code is corresponding to one preset basic application program identifier, the electronic device starts a basic application program corresponding to the basic application program identifier, and processes, using the basic application program, the information carried in the graphic code.

For example, when the identification code is a common web page address, information carried in the graphic code may be directly processed using a browser installed in the electronic device 120.

It should be noted that step 401, step 402, step 406 to step 409, and step 411 to step 413 may be implemented as a method for distribution information in a graphic code performed by the electronic device 120; and step 403 to step 405, and step 410 may be implemented as a method for distribution information in a graphic code performed by the server 140.

In conclusion, according to the method for distribution information in a graphic code provided in this embodiment of the present disclosure, an identification code is acquired in a selected graphic code. When the identification code does not exist in a pre-stored local distribution configuration file, a first update request is sent to a server, so that the server feeds back an application program identifier corresponding to the identification code, an application program corresponding to the application program identifier is started, and information corresponding to the graphic code is processed using the application program. This solves a problem in the prior art that a probability that information in a graphic code can be successfully processed is relatively low. Because the server updates an identification code of a graphic code and an application program identifier at any time, when there is no appropriate application program identifier corresponding to an acquired identification code of a graphic code in pre-stored application program identifiers, an appropriate application program identifier may be acquired from the server, an application program is determined according to the application program identifier, and information of the graphic code is processed according to the application program, that is, information in a graphic code is distributed to a corresponding application program for processing, which achieves an effect of improving a success rate of identifying a graphic code.

In a possible implementation manner, in order to facilitate management and querying of an identification code and an application program identifier corresponding to the identification code, a cloud distribution configuration file may further be set in the server 140, where the cloud distribution configuration file includes at least one mapping relationship, and each mapping relationship may include an identification code and an application program identifier corresponding to the identification code.

In an actual application, when finishing development of a graphic code, a developer generally uses an identification code of the graphic code and an identifier of an application program that can process the graphic code as one mapping relationship, and sends the mapping relationship to the server 140. The server 140 saves the received mapping relationship into the cloud distribution configuration file. For example, the server 140 receives a third update request, where the third update request includes an identification code and an application program identifier corresponding to the identification code; after receiving the third update request, the server 140 updates the cloud distribution configuration file using the identification code and the application program identifier corresponding to the identification code that are in the third update request. The third update request herein is a request that is sent by the developer to the server 140 using some electronic devices.

That the server 140 updates the cloud distribution configuration file using the identification code and the application program identifier corresponding to the identification code that are in the third update request may include the following several cases: firstly, when the third update request includes an adding instruction that is used to add an identification code and an application program identifier corresponding to the identification code, adding the identification code and the application program identifier corresponding to the identification code that are in the adding instruction into the cloud distribution configuration file; secondly, when the third update request includes a deleting instruction that is used to delete an identification code and an application program identifier corresponding to the identification code, deleting, from the cloud distribution configuration file, an identification code and an application program identifier corresponding to the identification code that are the same as those in the deleting instruction; thirdly, when the third update request includes a first replacing instruction that is used to replace an application program identifier corresponding to a specified identification code, replacing an application program identifier, which is corresponding to the identification code and is in the cloud distribution configuration file, with the application program identifier in the first replacing instruction; and fourthly, when the third update request includes a second replacing instruction that is used to replace an identification code corresponding to a specified application program identifier, replacing an identification code, which is corresponding to the application program identifier and is in the cloud distribution configuration file, with the identification code in the second replacing instruction.

In a possible implementation manner, in order to reduce time taken to perform distributing information in a graphic code as much as possible, an application program identifier in the server 140 is frequently updated into a local distribution configuration file in the electronic device 120. For example, the electronic device 120 may actively pull an application program identifier from the server 140, so as to update the local distribution configuration file; or the server 140 may actively send an application program identifier to the electronic device 120, so that the electronic device 120 updates the local distribution configuration file.

In some embodiments, the electronic device 120 actively sends a second update request to the server at a predetermined moment, where the predetermined moment is a moment of first-time running or a moment indicated at an interval of a predetermined time; the electronic device 120 receives third response information that is fed back by the server 140 after the second update request is received, where the third response information includes at least one mapping relationship, and each mapping relationship includes an identification code and an application program identifier corresponding to the identification code; and the electronic device 120 updates the local distribution configuration file according to the at least one mapping relationship included in the third response information. Alternatively, the electronic device 120 receives an update instruction sent by the server 140, where the update instruction includes at least one mapping relationship, and each mapping relationship includes an identification code and an application program identifier corresponding to the identification code; and the electronic device 120 updates the local distribution configuration file according to the at least one mapping relationship carried in the update instruction.

A process that the electronic device 120 updates the local distribution configuration file may include the following: The electronic device 120 detects whether the identification code exists in the local distribution configuration file; if a result of the detecting is that the identification code does not exist in the local distribution configuration file, the electronic device 120 adds an acquired identification code and an application program identifier corresponding to the identification code into the local distribution configuration file; if a result of the detecting is that the identification code exists in the local distribution configuration file, the electronic device 120 detects whether an application program identifier that is corresponding to the identification code and is in the local distribution configuration file is the same as the acquired application program identifier corresponding to the identification code; if the result of the detecting is that the application program identifier that is corresponding to the identification code and is in the local distribution configuration file is different from the acquired application program identifier corresponding to the identification code, the electronic device 120 replaces the application program identifier, which is corresponding to the identification code and is in the local distribution configuration file, with the acquired application program identifier corresponding to the identification code; and if the result of the detecting is that the application program identifier that is corresponding to the identification code and is in the local distribution configuration file is the same as the acquired application program identifier corresponding to the identification code, the electronic device 120 does not process the application program identifier in the local distribution configuration file.

Correspondingly, at a server 140 end, the server 140 receives the second update request that is sent by the electronic device 120 at the predetermined moment, where the predetermined moment is a moment of first-time running or a moment indicated at an interval of a predetermined time; after receiving the second update request, the server 140 feeds back third response information to the electronic device, where the third response information includes at least one mapping relationship, and each mapping relationship includes an identification code and an application program identifier corresponding to the identification code, so that the electronic device 120 updates the local distribution configuration file according to the at least one mapping relationship included in the third response information. Alternatively, the server 140 sends an update instruction to the electronic device 120, where the update instruction includes at least one mapping relationship, and each mapping relationship includes an identification code and an application program identifier corresponding to the identification code, so that the electronic device 120 updates the local distribution configuration file according to the at least one mapping relationship included in the update instruction.

Figure 5:
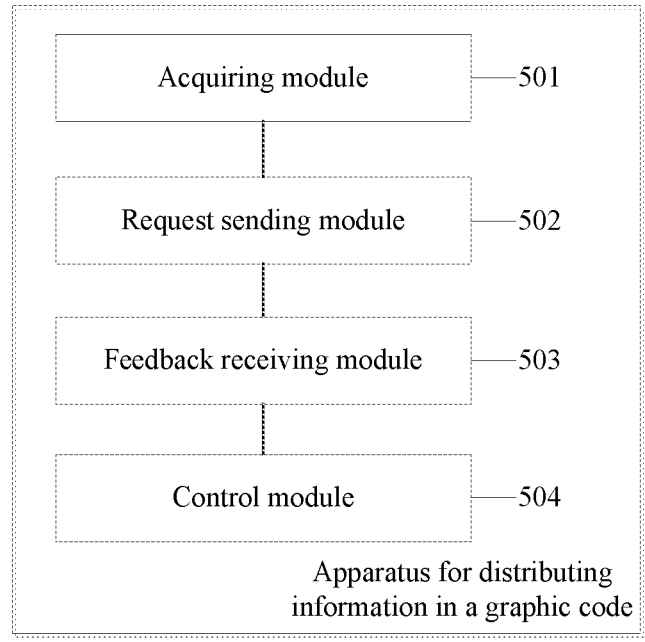
FIG. 5 is a schematic structural diagram of an apparatus for distributing information in a graphic code according to an embodiment of the present disclosure.

FIG. 5 shows a schematic structural diagram of an apparatus for distribution information in a graphic code according to an embodiment of the present disclosure. The apparatus for distribution information in a graphic code may be implemented as an electronic device or a part of an electronic device. The electronic device mentioned herein may be described using the electronic device 120 shown in FIG. 1 as an example. The apparatus for distribution information in a graphic code may include an acquiring module 501, a request sending module 502, a feedback receiving module 503, and a control module 504.

The acquiring module 501 may be configured to acquire an identification code in a selected graphic code.

The request sending module 502 may be configured to, when the identification code acquired by the acquiring module 501 does not exist in a pre-stored local distribution configuration file, send to a server a first update request that includes the identification code, where the local distribution configuration file includes at least one mapping relationship, and each mapping relationship includes an identification code and an application program identifier corresponding to the identification code.

The feedback receiving module 503 may be configured to receive first response information that is fed back by the server after the server receives the first update request, where the first response information includes the identification code and an application program identifier corresponding to the identification code.

The control module 504 may be configured to start, according to the application program identifier in the first response information received by the feedback receiving module 503, an application program corresponding to the application program identifier, where the application program is used to process information carried in the graphic code.

In conclusion, the apparatus for distributing information in a graphic code provided in this embodiment of the present disclosure acquires an identification code in a selected graphic code. When the identification code does not exist in a pre-stored local distribution configuration file, the apparatus acquires an application program identifier corresponding to the identification code from a server, and starts an application program corresponding to the application program identifier, where the application program is used to process information corresponding to the graphic code. This solves a problem in the prior art that a probability that information in a graphic code can be successfully processed is relatively low. Because the server updates an identification code of a graphic code and an application program identifier at any time, when there is no appropriate application program identifier corresponding to an acquired identification code of a graphic code in pre-stored application program identifiers, an appropriate application program identifier may be acquired from the server, an application program is determined according to the application program identifier, and information of the graphic code is processed according to the application program, that is, information in a graphic code is distributed to a corresponding application program for processing, which achieves an effect of improving a success rate of identifying a graphic code.

Figure 6:
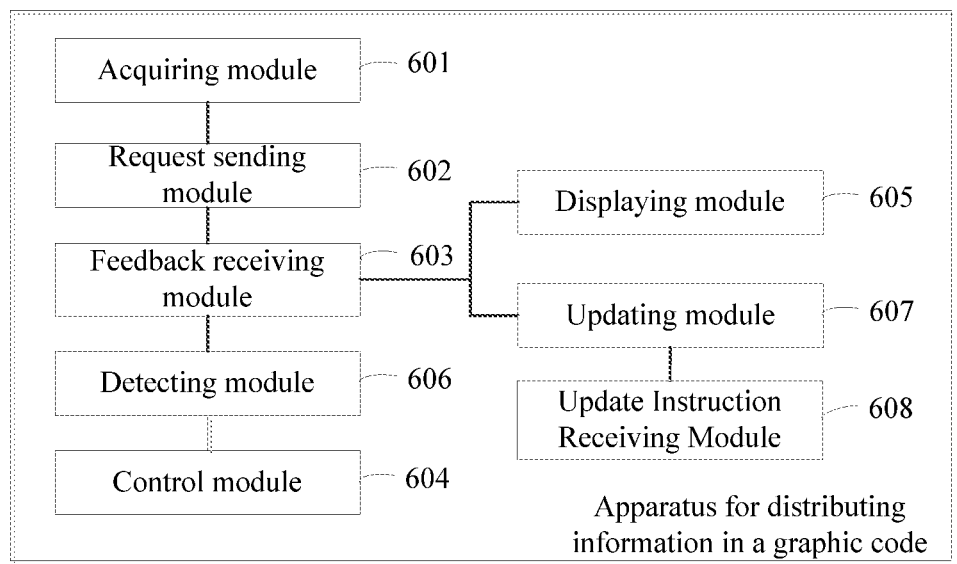
FIG. 6 is a schematic structural diagram of an apparatus for distributing information in a graphic code according to another embodiment of the present disclosure.

FIG. 6 shows a schematic structural diagram of an apparatus for distributing information in a graphic code according to another embodiment of the present disclosure. The apparatus for distributing information in a graphic code may be implemented as an electronic device or a part of an electronic device. The electronic device mentioned herein may be described using the electronic device 120 shown in FIG. 1 as an example. The apparatus for distributing information in a graphic code may include an acquiring module 601, a request sending module 602, a feedback receiving module 603, and a control module 604.

The acquiring module 601 may be configured to acquire an identification code in a selected graphic code.

The request sending module 602 may be configured to, when the identification code acquired by the acquiring module 601 does not exist in a pre-stored local distribution configuration file, send to a server a first update request that includes the identification code, where the local distribution configuration file includes at least one mapping relationship, and each mapping relationship includes an identification code and an application program identifier corresponding to the identification code.

The feedback receiving module 603 may be configured to receive first response information that is fed back by the server after the server receives the first update request, where the first response information includes the identification code and an application program identifier corresponding to the identification code.

The control module 604 may be configured to start, according to the application program identifier in the first response information received by the feedback receiving module 603, an application program corresponding to the application program identifier, where the application program is used to process information carried in the graphic code.

In a possible implementation manner, the apparatus for distribution information in a graphic code may further include a displaying module 605.

The displaying module 605 may be configured to, when the application program corresponding to the application program identifier in the first response information received by the feedback receiving module 603 is not installed, display a download page of the application program corresponding to the application program identifier, and prompt a user to download the application program.

In a possible implementation manner, the apparatus for distributing information in a graphic code may further include a detecting module 606.

The feedback receiving module 603 may further be configured to receive second response information that is fed back by the server after the server receives the first update request, where the second response information is used to indicate that in the server there is not an application program identifier corresponding to the identification code.

The detecting module 606 may be configured to detect whether the identification code in the second response information received by the feedback receiving module 603 is corresponding to a preset basic application program identifier, where a basic application program corresponding to the basic application program identifier includes an SMS application program, a browser, or an address book.

The control module 604 may further be configured to, when a result of the detecting of the detecting module 606 is that the identification code is corresponding to one preset basic application program identifier, start a basic application program corresponding to the basic application program identifier, and process, using the basic application program, the information carried in the graphic code.

In a possible implementation manner, the control module 604 is further configured to, when there are two or more than two application program identifiers, remind a user to select application programs corresponding to the application program identifiers.

The control module 604 may further be configured to, after a selection instruction that the user selects an application program identifier is received, determine an application program identifier according to the selection instruction.

The control module 604 may further be configured to start, according to the determined application program identifier, an application program corresponding to the application program identifier.

In a possible implementation manner, the apparatus for distributing information in a graphic code may further include an updating module 607, where the request sending module 602 is further configured to actively send a second update request to the server at a predetermined moment, where the predetermined moment is a moment of first-time running or a moment indicated at an interval of a predetermined time; the feedback receiving module 603 is further configured to receive third response information that is fed back by the server after the server receives the second update request, where the third response information includes at least one mapping relationship, and each mapping relationship includes an identification code and an application program identifier corresponding to the identification code; and the updating module 607 is configured to update the local distribution configuration file according to the at least one mapping relationship included in the third response information; or, the apparatus for distributing information in a graphic code further includes an update instruction receiving module 608 and an updating module 607, where the update instruction receiving module 608 is configured to receive an update instruction sent by the server, where the update instruction includes at least one mapping relationship, and each mapping relationship includes an identification code and an application program identifier corresponding to the identification code; and the updating module 607 is configured to update the local distribution configuration file according to the at least one mapping relationship carried in the update instruction.

In conclusion, the apparatus for distribution information in a graphic code provided in this embodiment of the present disclosure acquires an identification code in a selected graphic code. When the identification code does not exist in a pre-stored local distribution configuration file, the apparatus acquires an application program identifier corresponding to the identification code from a server, and starts an application program corresponding to the application program identifier, where the application program is used to process information corresponding to the graphic code. This solves a problem in the prior art that a probability that information in a graphic code can be successfully processed is relatively low. Because the server updates an identification code of a graphic code and an application program identifier at any time, when there is no appropriate application program identifier corresponding to an acquired identification code of a graphic code in pre-stored application program identifiers, an appropriate application program identifier may be acquired from the server, an application program is determined according to the application program identifier, and information of the graphic code is processed according to the application program, that is, information in a graphic code is distributed to a corresponding application program for processing, which achieves an effect of improving a success rate of identifying a graphic code.

Figure 7:
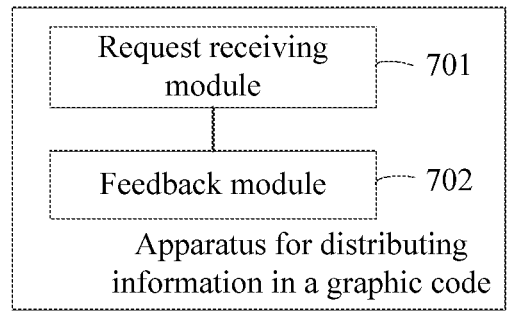
FIG. 7 is a schematic structural diagram of an apparatus for distributing information in a graphic code according to still another embodiment of the present disclosure.

FIG. 7 shows a schematic structural diagram of an apparatus for distributing information in a graphic code according to still another embodiment of the present disclosure. The apparatus for distributing information in a graphic code may be implemented as a server or a part of a server. The server mentioned herein may be described using the server 140 shown in FIG. 1 as an example. The apparatus for distributing information in a graphic code may include a request receiving module 701 and a feedback module 702.

The request receiving module 701 may be configured to receive a first update request that includes an identification code, where the first update request is sent by an electronic device after the electronic device acquires the identification code in a selected graphic code and when the identification code does not exist in a local distribution configuration file pre-stored in the electronic device.

The feedback module 702 may be configured to, after the request receiving module 701 receives the first update request, feed back first response information to the electronic device, where the first response information includes the identification code and an application program identifier corresponding to the identification code, so that the electronic device receives the first response information; and the electronic device starts, according to the application program identifier in the first response information, an application program corresponding to the application program identifier, where the application program is used to process information carried in the graphic code.

The apparatus for distribution information in a graphic code provided in this embodiment of the present disclosure receives a first update request that includes an identification code and is sent by an electronic device, and feeds back to the electronic device first response information that includes the identification code and an application program identifier corresponding to the identification code, so that the electronic device starts an application program corresponding to the application program identifier in the first response information, where the application program is used to process information corresponding to the graphic code. This solves a problem in the prior art that a probability that information in a graphic code can be successfully processed is relatively low. Because a server updates an identification code of a graphic code and an application program identifier at any time, when there is no appropriate application program identifier corresponding to an acquired identification code of a graphic code in pre-stored application program identifiers, an appropriate application program identifier may be acquired from the server, an application program is determined according to the application program identifier, and information of the graphic code is processed according to the application program, that is, information in a graphic code is distributed to a corresponding application program for processing, which achieves an effect of improving a success rate of identifying a graphic code.

Figure 8:
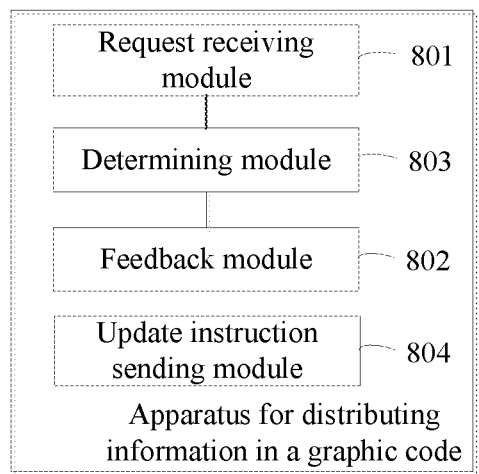
FIG. 8 is a schematic structural diagram of an apparatus for distributing information in a graphic code according to yet another embodiment of the present disclosure.

FIG. 8 shows a schematic structural diagram of an apparatus for distributing information in a graphic code according to yet another embodiment of the present disclosure. The apparatus for distributing information in a graphic code may be implemented as a server or a part of a server. The server mentioned herein may be described using the server 140 shown in FIG. 1 as an example. The apparatus for distributing information in a graphic code may include a request receiving module 801 and a feedback module 802.

The request receiving module 801 may be configured to receive a first update request that includes an identification code, where the first update request is sent by an electronic device after the electronic device acquires the identification code in a selected graphic code and when the identification code does not exist in a local distribution configuration file pre-stored in the electronic device.

The feedback module 802 may be configured to, after the request receiving module 801 receives the first update request, feed back first response information to the electronic device, where the first response information includes the identification code and an application program identifier corresponding to the identification code, so that the electronic device receives the first response information, and the electronic device starts, according to the application program identifier in the first response information, an application program corresponding to the application program identifier, where the application program is used to process information carried in the graphic code.

In a possible implementation manner, the apparatus for distributing information in a graphic code may further include a determining module 803.

The determining module 803 may be configured to determine whether there is an application program identifier corresponding to the identification code.

The feedback module 802 may be configured to, when a result of the determining is that there is an application program identifier corresponding to the identification code, execute the step of feeding back first response information to the electronic device.

The feedback module 802 may further be configured to, when a result of the determining is that there is not an application program identifier corresponding to the identification code, feed back second response information to the electronic device, where the second response information is used to indicate that there is not an application program identifier corresponding to the identification code.

In a possible implementation manner, the request receiving module 801 may further be configured to receive a second update request sent by the electronic device at a predetermined moment, where the predetermined moment is a moment of first-time running or a moment indicated at an interval of a predetermined time; and the feedback module 802 may further be configured to feed back third response information to the electronic device after the second update request is received, where the third response information includes at least one mapping relationship, and each mapping relationship includes an identification code and an application program identifier corresponding to the identification code, so that the electronic device updates the local distribution configuration file according to the at least one mapping relationship included in the third response information; or, the apparatus for distributing information in a graphic code further includes an update instruction sending module 804, where the update instruction sending module 804 may be configured to send an update instruction to the electronic device, where the update instruction includes at least one mapping relationship, and each mapping relationship includes an identification code and an application program identifier corresponding to the identification code, so that the electronic device updates the local distribution configuration file according to the at least one mapping relationship included in the update instruction.

In conclusion, the apparatus for distributing information in a graphic code provided in this embodiment of the present disclosure receives a first update request that includes an identification code and is sent by an electronic device, and feeds back to the electronic device first response information that includes the identification code and an application program identifier corresponding to the identification code, so that the electronic device starts an application program corresponding to the application program identifier in the first response information, where the application program is used to process information corresponding to the graphic code. This solves a problem, in the prior art, that a probability that information in a graphic code can be successfully processed is relatively low. Because a server updates an identification code of a graphic code and an application program identifier at any time, when there is no appropriate application program identifier corresponding to an acquired identification code of a graphic code in pre-stored application program identifiers, an appropriate application program identifier may be acquired from the server, an application program is determined according to the application program identifier, and information of the graphic code is processed according to the application program, that is, information in a graphic code is distributed to a corresponding application program for processing, which achieves an effect of improving a success rate of identifying a graphic code.

Figure 9:
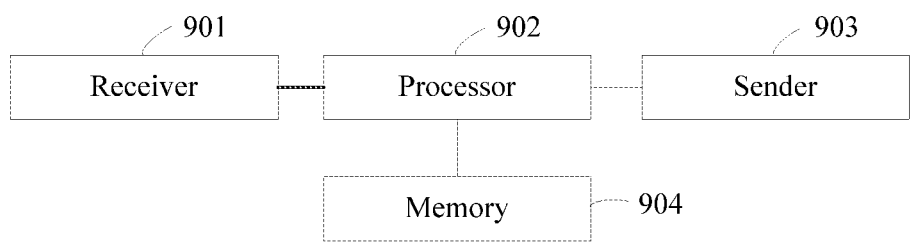
FIG. 9 is a schematic structural diagram of an electronic device according to an embodiment of the present disclosure.

FIG. 9 shows a schematic structural diagram of an electronic device according to an embodiment of the present disclosure. The electronic device may be described using the electronic device 120 shown in FIG. 1 as an example. The electronic device includes a receiver 901, a processor 902, a sender 903, and a memory 904, where the processor 902 is separately coupled with the receiver 901, the sender 903, and the memory 904, the memory 904 may include at least one type of computer software, and the processor 902 may perform a corresponding operation according to the computer software.

The processor 902 may be configured to acquire an identification code in a selected graphic code.

The sender 903 may further be configured to, when the identification code does not exist in a pre-stored local distribution configuration file, send to a server a first update request that includes the identification code.

The receiver 901 may be configured to receive first response information that is fed back by the server after the server receives the first update request, where the first response information includes the identification code and an application program identifier corresponding to the identification code.

The processor 902 may further be configured to start, according to the application program identifier in the first response information, an application program corresponding to the application program identifier, where the application program is used to process information carried in the graphic code.

The local distribution configuration file includes at least one mapping relationship, and each mapping relationship includes an identification code and an application program identifier corresponding to the identification code.

In a possible implementation manner, the processor 902 may further be configured to, when the application program corresponding to the application program identifier in the first response information is not installed, control to display a download page of the application program corresponding to the application program identifier, and prompt a user to download the application program.

In a possible implementation manner, the receiver 901 may further be configured to receive second response information that is fed back by the server after the server receives the first update request, where the second response information is used to indicate that in the server there is not an application program identifier corresponding to the identification code.

The processor 902 may further be configured to detect whether the identification code is corresponding to a preset basic application program identifier, where a basic application program corresponding to the basic application program identifier includes an SMS application program, a browser, or an address book.

The processor 902 may further be configured to, when a result of the detecting is that the identification code is corresponding to one preset basic application program identifier, start a basic application program corresponding to the basic application program identifier, and process, using the basic application program, the information carried in the graphic code.

In a possible implementation manner, the processor 902 may further be configured to, when there are two or more than two application program identifiers, remind a user to select application programs corresponding to the application program identifiers.

The processor 902 may further be configured to, after a selection instruction that the user selects an application program identifier is received, determine an application program identifier according to the selection instruction.

The processor 902 may further be configured to start, according to the determined application program identifier, an application program corresponding to the application program identifier.

In a possible implementation manner, the sender 903 may further be configured to actively send a second update request to the server at a predetermined moment, where the predetermined moment is a moment of first-time running or a moment indicated at an interval of a predetermined time; the receiver 901 may further be configured to receive third response information that is fed back by the server after the server receives the second update request, where the third response information includes at least one mapping relationship, and each mapping relationship includes an identification code and an application program identifier corresponding to the identification code; and the processor 902 may further be configured to update the local distribution configuration file according to the at least one mapping relationship included in the third response information; or, the receiver 901 may further be configured to receive an update instruction sent by the server, where the update instruction includes at least one mapping relationship, and each mapping relationship includes an identification code and an application program identifier corresponding to the identification code; and the processor 902 may further be configured to update the local distribution configuration file according to the at least one mapping relationship carried in the update instruction.

In conclusion, the electronic device provided in this embodiment of the present disclosure acquires an identification code in a selected graphic code. When the identification code does not exist in a pre-stored local distribution configuration file, the electronic device sends to a server a first update request that includes the identification code, so that the server feeds back an application program identifier corresponding to the identification code, and the electronic device starts an application program corresponding to the application program identifier, where the application program is used to process information corresponding to the graphic code. This solves a problem in the prior art that a probability that information in a graphic code can be successfully processed is relatively low. Because the server updates an identification code of a graphic code and an application program identifier at any time, when there is no appropriate application program identifier corresponding to an acquired identification code of a graphic code in pre-stored application program identifiers, an appropriate application program identifier may be acquired from the server, an application program is determined according to the application program identifier, and information of the graphic code is processed according to the application program, that is, information in a graphic code is distributed to a corresponding application program for processing, which achieves an effect of improving a success rate of identifying a graphic code.

Figure 10:
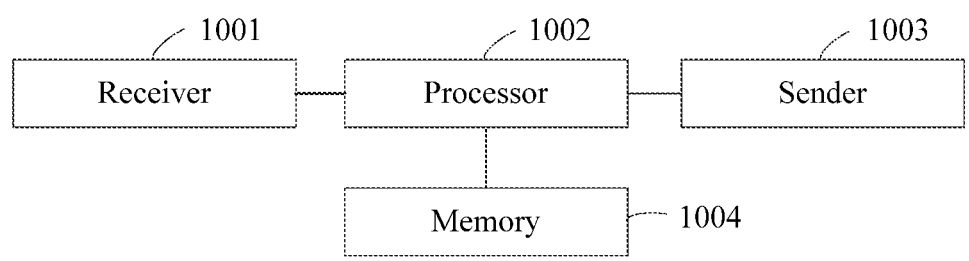
FIG. 10 is a schematic structural diagram of a server according to an embodiment of the present disclosure.

FIG. 10 shows a schematic structural diagram of a server according to an embodiment of the present disclosure. The server may be described using the server 140 shown in FIG. 1 as an example. The server includes a receiver 1001, a processor 1002, a sender 1003, and a memory 1004, where the processor is separately coupled with the receiver, the sender, and the memory 1004, the memory 1004 may include at least one type of computer software, and the processor 1002 may perform a corresponding operation according to the computer software.

The receiver 1001 may be configured to receive a first update request that includes an identification code, where the first update request is sent by an electronic device after the electronic device acquires the identification code in a selected graphic code and when the identification code does not exist in a local distribution configuration file pre-stored in the electronic device.

The sender 1003 may be configured to feed back first response information to the electronic device after the first update request is received, where the first response information includes the identification code and an application program identifier corresponding to the identification code, so that the electronic device receives the first response information, and the electronic device starts, according to the application program identifier in the first response information, an application program corresponding to the application program identifier, where the application program is used to process information carried in the graphic code.

In a possible implementation manner, the processor 1002 may be configured to determine whether there is an application program identifier corresponding to the identification code.

The sender 1003 may be configured to, when a result of the determining is that there is an application program identifier corresponding to the identification code, execute the step of a feeding back first response information to the electronic device.

The sender 1003 may further be configured to, when a result of the determining is that there is not an application program identifier corresponding to the identification code, feed back second response information to the electronic device, where the second response information is used to indicate that there is not an application program identifier corresponding to the identification code.

In a possible implementation manner, the receiver 1001 may further be configured to receive a second update request sent by the electronic device at a predetermined moment, where the predetermined moment is a moment of first-time running or a moment indicated at an interval of a predetermined time; and the sender 1003 may further be configured to feed back third response information to the electronic device after the second update request is received, where the third response information includes at least one mapping relationship, and each mapping relationship includes an identification code and an application program identifier corresponding to the identification code, so that the electronic device updates the local distribution configuration file according to the at least one mapping relationship included in the third response information; or, the sender 1003 may further be configured to send an update instruction to the electronic device, where the update instruction includes at least one mapping relationship, and each mapping relationship includes an identification code and an application program identifier corresponding to the identification code, so that the electronic device updates the local distribution configuration file according to the at least one mapping relationship included in the update instruction.

In conclusion, the server provided in this embodiment of the present disclosure receives a first update request that includes an identification code and is sent by an electronic device, and feeds back to the electronic device first response information that includes the identification code and an application program identifier corresponding to the identification code, so that the electronic device starts an application program corresponding to the application program identifier in the first response information, where the application program is used to process information corresponding to the graphic code. This solves a problem in the prior art that a probability that information in a graphic code can be successfully processed is relatively low. Because a server updates an identification code of a graphic code and an application program identifier at any time, when there is no appropriate application program identifier corresponding to an acquired identification code of a graphic code in pre-stored application program identifiers, an appropriate application program identifier may be acquired from the server, an application program is determined according to the application program identifier, and information of the graphic code is processed according to the application program, that is, information in a graphic code is distributed to a corresponding application program for processing, which achieves an effect of improving a success rate of identifying a graphic code.

Figure 11:
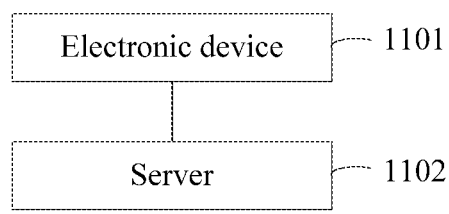
FIG. 11 is a schematic diagram of a system for distributing information in a graphic code according to an embodiment of the present disclosure.

FIG. 11 shows a schematic diagram of a system for distributing information in a graphic code according to an embodiment of the present disclosure. The system for distributing information in a graphic code may include at least one electronic device 1101 and a server 1102, where each electronic device 1101 may be connected to the server 1102 in a wired network manner or a wireless network manner.

The electronic device 1101 may include the apparatus for distributing information in a graphic code shown in FIG. 5 or FIG. 6; and the server 1102 may include the apparatus for distributing information in a graphic code shown in FIG. 7 or FIG. 8.

Alternatively, the electronic device 1101 may be the electronic device shown in FIG. 9; and the server 1102 may be the server shown in FIG. 10.

According to the system for distributing information in a graphic code provided in the embodiment of the present disclosure, an identification code is acquired in a selected graphic code. When the identification code does not exist in a pre-stored local distribution configuration file, a first update request that includes the identification code is sent to a server, so that the server feeds back an application program identifier corresponding to the identification code, and the electronic device starts an application program corresponding to the application program identifier, where the application program is used to process information corresponding to the graphic code, which solves a problem, in the prior art, that a probability that information in a graphic code can be successfully processed is relatively low. Because the server updates an identification code of a graphic code and an application program identifier at any time, when in pre-stored application program identifiers, there is no appropriate application program identifier corresponding to an acquired identification code of a graphic code, an appropriate application program identifier may be acquired from the server, an application program is determined according to the application program identifier, and information of the graphic code is processed according to the application program, that is, information in a graphic code is distributed to a corresponding application program for processing, which achieves an effect of improving a success rate of identifying a graphic code.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method, implemented on an electronic device, comprising:
   acquiring, by the electronic device, a plurality of identification codes in a graphic code;
   comparing, by the electronic device, the identification codes in the graphic code to pre-stored identification codes in a local distribution configuration file stored in the electronic device, wherein the local distribution configuration file comprises mapping relationships between the pre-stored identification codes and corresponding application program identifiers;
   sending, by the electronic device, a first request comprising the identification codes to an application server when none of the pre-stored identification codes in the local distribution configuration file matches the identification codes in the graphic code;
   receiving, by the electronic device, a first response from the application server, wherein the first response comprises application program identifiers corresponding to the identification codes, and wherein each identification code and each application program identifier corresponds uniquely to one application program;
   receiving, by the electronic device, a user selection of one of the application programs; and
   initiating, by the electronic device, the one of the application programs in response to receiving the user selection, wherein the one of the application programs is used to process information carried in the graphic code.

2. The method of claim 1, further comprising displaying, by the electronic device, a download page of the one of the application programs in response to the user selection when the one of the application programs is not installed locally on the electronic device.

3. The method of claim 1, wherein after sending the first request to the application server, the method further comprises:
   receiving, by the electronic device, a second response from the application server, wherein the second response indicates that no application program stored in the application server corresponds to the identification codes in the graphic code;
   detecting, by the electronic device, whether the identification codes correspond to a basic application program identifier, wherein a basic application program corresponding to the basic application program identifier comprises a short message service (SMS) application program, a browser, or an address book;
   initiating, by the electronic device, a basic application program corresponding to the basic application program identifier when at least one of the identification codes corresponds the to the basic application program identifier; and
   processing, by the electronic device, the information carried in the graphic code using the basic application program.

4. The method of claim 1, further comprising:
   actively sending, by the electronic device, a second request to the application server at a predetermined moment, wherein the predetermined moment is a moment of first-time running or a moment indicated at an interval of a predetermined time;
   receiving, by the electronic device, a third response from the application server, wherein the third response comprises mapping relationships between the identification codes and the application program identifiers; and
   updating, by the electronic device, the local distribution configuration file according to the mapping relationships.

5. The method of claim 1, further comprising displaying, by the electronic device, prompts on a display of the electronic device for downloading the applications programs when the electronic device determines that the application programs are not stored in the electronic device.

6. The method of claim 1, further comprising analyzing, by the electronic device, the graphic code with a processor of the electronic device to generate the identification codes.

7. The method of claim 1, further comprising:
   receiving, by the electronic device, a text message that includes the graphic code;
   receiving, by the electronic device, a second user selection of the graphic code in the text message; and
   analyzing, by the electronic device, the graphic code in the text message to generate the identification codes.

8. The method of claim 1, further comprising:
   receiving, by the electronic device, a web page that includes the graphic code;
   receiving, by the electronic device, a second user selection of the graphic code in the web page; and
   analyzing, by the electronic device, the graphic code in the web page to generate the identification codes.

9. The method of claim 1, further comprising:
   receiving, by the electronic device, an image of the graphic code from a camera of the electronic device; and analyzing, by the electronic device, the image of the graphic code using a processor of the electronic device to generate the identification codes.

10. The method of claim 1, wherein the one of the application programs comprises a text message application.

11. The method of claim 1, wherein the one of the application programs comprises a web browser.

12. The method of claim 1, wherein the one of the application programs comprises an address book.

13. An apparatus, comprising:
a memory configured to store instructions; and
a processor coupled to the memory and configured to execute the instructions, which cause the apparatus to:
acquire a plurality of identification codes in a graphic code;
compare the identification codes in the graphic code to pre-stored identification codes in a local distribution configuration file stored in the apparatus, wherein the local distribution configuration file comprises mapping relationships between the pre-stored identification codes and corresponding application program identifiers;
send to an application server a first request comprising the identification codes when none of the pre-stored identification codes in the local distribution configuration file matches the identification codes in the graphic code;
receive a first response from the application server, wherein the first response comprises application program identifiers corresponding to the identification codes, and wherein each identification code and each application program identifier corresponds uniquely to one application program;
receive a user selection of one of the application programs; and
initiate the one of the application programs in response to receiving the user selection, wherein the one of the application programs is used to process information carried in the graphic code.

14. The apparatus of claim 13, wherein the instructions further cause the apparatus to display a download page of the one of the application programs in response to the user selection when the one of the application programs is not installed locally on the apparatus.

15. The apparatus of claim 13, wherein the instructions further cause the apparatus to:
receive a second response from the application server after sending to the application server the first request, wherein the second response indicates that no application program stored in the application server corresponds to the identification codes in the graphic code;
detect whether the identification codes correspond to a basic application program identifier, wherein a basic application program corresponding to the basic application program identifier comprises a short message service (SMS) application program, a browser, or an address book;
initiate a basic application program corresponding to the basic application program identifier when at least one of the identification codes corresponds to the basic application program identifier; and
process the information carried in the graphic code using the basic application program.

16. The apparatus of claim 13, wherein the instructions further cause the apparatus to:
actively send a second request to the application server at a predetermined moment, wherein the predetermined moment is a moment of a first-time running or a moment indicated at an interval of a predetermined time;
receive a third response from the application server, wherein the third response comprises mapping relationships between the identification codes and the application program identifiers; and
update the local distribution configuration file according to the mapping relationships.

17. A non-transitory computer-readable storage medium comprising instructions which, when executed by a processor, cause the processor to:
acquire a plurality of identification codes in a graphic code;
determine whether the identification codes exist in a local distribution configuration file by comparing the identification codes in the graphic code to pre-stored identification codes stored in the local distribution configuration file, wherein the local distribution configuration file comprises mapping relationships between the pre-stored identification codes and corresponding application program identifiers;
send to an application server a first request comprising the identification codes when none of the identification codes exists in the local distribution configuration file;
receive a first response from the application server when none of the identification codes exists in the local distribution configuration file, wherein the first response comprises application program identifiers corresponding to the identification codes, and wherein each identification code and each application program identifier corresponds uniquely to one application program;
receive a user selection of one of the application programs; and
initiate the one of the application programs in response to receiving the user selection, wherein the one of the application programs is used to process information carried in the graphic code.

18. The non-transitory computer-readable storage medium of claim 17, wherein the instructions further cause the processor to display a download page of the one of the application programs in response to the user selection when the one of the application programs is not installed locally.

19. The non-transitory computer-readable storage medium of claim 17, wherein the instructions further cause the processor to:
receive a second response from the application server after sending to the application server the first request, wherein the second response indicates that no application program stored in the application server corresponds to the identification codes in the graphic code;
detect whether the identification codes correspond to a basic application program identifier, wherein a basic application program corresponding to the basic application program identifier comprises a short message service (SMS) application program, a browser, or an address book;
initiate a basic application program corresponding to the basic application program identifier when at least one of the identification codes corresponds to the basic application program identifier; and
process the information carried in the graphic code using the basic application program.

20. The non-transitory computer-readable storage medium of claim 17, wherein the instructions further cause the processor to:

actively send a second request to the application server at a predetermined moment, wherein the predetermined moment is a moment of a first-time running or a moment indicated at an interval of a predetermined time;

receive a third response from the application server, wherein the third response comprises mapping relationships between the identification codes and the application program identifiers; and update the local distribution configuration file according to the mapping relationships.

* * * * *